(12) United States Patent
Mehaffey et al.

(10) Patent No.: US 6,233,954 B1
(45) Date of Patent: May 22, 2001

(54) METHOD FOR CONTROLLING THE OPERATION OF A COMPRESSION SYSTEM HAVING A PLURALITY OF COMPRESSORS

(75) Inventors: James D. Mehaffey, Mooresville; Marty L. Connell, Charlotte, both of NC (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/300,501

(22) Filed: Apr. 28, 1999

(51) Int. Cl.$^7$ ....................................................... F25B 7/00
(52) U.S. Cl. ............................... 62/175; 417/4; 236/1 EA
(58) Field of Search ............................ 417/4, 7; 62/175; 236/1 EA

(56) References Cited

U.S. PATENT DOCUMENTS

| | | |
|---|---|---|
| 2,921,732 | 1/1960 | De Vin . |
| 3,463,382 | 8/1969 | Wusteney . |
| 4,152,902 | 5/1979 | Lush . |
| 5,343,384 | 8/1994 | Fisher et al. . |
| 5,347,467 | 9/1994 | Staroselsky et al. . |

Primary Examiner—William Doerrler
Assistant Examiner—Malik N. Drake
(74) Attorney, Agent, or Firm—Michael Best & Friedrich LLP

(57) ABSTRACT

A fluid compression system includes a plurality of compressors, each compressor having a local controller for controlling operation thereof and a sensor for sensing the pressure of compressed fluid discharged therefrom. A method for controlling operation of the fluid compression system includes establishing a set point pressure threshold for loading and unloading each compressor, and assigning a ranking to each compressor for identifying a highest ranked compressor and a lowest ranked compressor, whereby the highest ranked compressor for the compression system initiates all commands for controlling all of the lower ranked compressors in the compression system. The method also includes commencing a loading subroutine including loading the highest ranked unloaded compressor, setting a load delay timer, sensing the pressure of the compressed fluid discharged from the highest ranked compressor, comparing the sensed discharge pressure of the highest ranked compressor to the set point pressure threshold established for the highest ranked compressor, and transmitting a load command from the controller of the highest ranked compressor to the controller of the next highest ranked unloaded compressor if the sensed discharge pressure of the highest ranked compressor remains less than or equal to the set point pressure threshold established for the highest ranked compressor, and the load delay timer equals zero. The loading subroutine is repeated until the discharge pressure of the highest ranked compressor is greater than the set point pressure threshold established therefor.

12 Claims, 3 Drawing Sheets

METHOD FOR CONTROLLING THE OPERATION OF A COMPRESSION SYSTEM HAVING A PLURALITY OF COMPRESSORS

BACKGROUND OF THE INVENTION

1. Field of the Invention

The present invention generally relates to the art of fluid compression. More specifically, the present invention relates to methods for controlling the operation of an air compression system having a plurality of rotary screw compressors.

2. Brief Description of the Prior Art

Compression systems having a plurality of individual compressors are generally sequenced so as to improve the overall efficiency of the compression system and minimize premature wearing of the individual compressors. Sequencing has traditionally been accomplished using external devices or controllers. The earliest sequencing devices were electromechanical devices that controlled compressors with a series of staggered pressure bands.

More recent sequencing devices include host controllers with electronic microprocessors for loading and unloading compressors over a single pressure band. These electronic sequencers are also capable of automatically changing the sequencing order of the compressors. Generally, the host controller receives a pressure reading from a supply line pressure sensor and compares the actual pressure reading to a set point pressure range or pressure bandwidth, to determine whether it is necessary to load, unload and/or modulate any of the compressors in the system.

In such conventional compressor systems, one of the compressors is designated the lead compressor for the system and one or more of the compressors are designated the lag compressors for the system. During operation of the conventional compressor system, the supply line pressure fluctuates primarily because of changes in the demand for compressed fluid. As a result, from time to time it is necessary to modulate one or more of the compressors in order to maintain the required system pressure.

FIG. 1 shows a prior art compression system including an external device for sequencing operation of two or more compressors. The compression system 10 includes a host controller 12, a lead compressor 14, a lag compressor 16, and a supply line pressure sensor 18 that is flow connected to compressed fluid supply line 20. In the compression system shown in FIG. 1, the demand for compressed air requires that the lead compressor 14 be continuously operated in a fully loaded state, and the lag compressor 16 is modulated between unloaded and fully loaded operation.

During operation of the compression system 10, the host controller 12 decides when to modulate the lag compressor 16 based upon the pressure level sensed by the supply line pressure sensor 18. The host controller compares the actual sensed supply line pressure with the predetermined set point pressure range stored in the memory of the host controller. When the supply line pressure is outside the acceptable supply line pressure range and is greater than the acceptable set point supply line pressure, the host controller sends a signal to the lag compressor 16 and unloads the compressor until the actual supply line pressure is within the acceptable supply line pressure range. The lead compressor 14 remains fully loaded at all times.

When the actual supply line pressure is less than the acceptable supply line pressure, the host controller 12 transmits a load signal to the lag compressor 16 to fully load the lag compressor, and the lag compressor 16 runs fully loaded until the actual supply line pressure is within the acceptable operating range. When the lag compressor is fully loaded, the lead compressor remains fully loaded. The host controller 12 continuously cycles the compressors between loaded and unloaded modes during operation of the multiple compressor system 10, thereby minimizing wear of the compressors.

Adding a host controller or external device for controlling operation of a plurality of compressors adds significant cost and complexity to an air compression system. Thus, it is apparent that it would be advantageous to provide a method for controlling the operation of a compression system that sequences air compressors over a single pressure band without using an expensive host controller or external device. Accordingly, a suitable alternative is provided including features more fully disclosed hereinafter.

SUMMARY OF THE INVENTION

In accordance with one preferred embodiment of the present invention, a fluid compression system includes a plurality of compressors, each compressor having a local controller for controlling operation thereof and a sensor for sensing the pressure of compressed fluid discharged therefrom. The method includes the steps of establishing a set point pressure threshold for loading and unloading each compressor, and assigning a ranking to each compressor for identifying a highest ranked compressor and a lowest ranked compressor. In preferred embodiments, the highest ranked compressor initiates all commands for controlling all of the lower ranked compressors in the compression system. The method also includes the step of commencing a loading subroutine including loading the highest ranked unloaded compressor, setting a load delay timer, sensing the pressure of the compressed fluid discharged from the highest ranked compressor, comparing the sensed discharge pressure of the highest ranked compressor to the set point pressure threshold established for the highest ranked compressor, and transmitting a load command from the controller of the highest ranked compressor to the controller of the next highest ranked unloaded compressor if the sensed discharge pressure of the highest ranked compressor remains less than or equal to the set point pressure threshold and if the load delay timer has expired (i.e. equals zero (0)). The loading subroutine is repeated until the discharge pressure of the highest ranked compressor is greater than the set point pressure threshold established therefor.

In certain preferred embodiments, the local controller of the highest ranked compressor commences an unloading routine if the discharge pressure of the highest ranked compressor is greater than the set point pressure threshold of the highest ranked compressor. The unloading subroutine includes the steps of unloading the lowest ranked loaded compressor and setting an unload delay timer. After the lowest ranked loaded compressor has been unloaded, the pressure of the compressed fluid discharged from the highest ranked compressor is sensed and the sensed discharge pressure of the highest ranked compressor is compared to the set point pressure threshold established for the highest ranked compressor. An unload command is then transmitted from the controller of the highest ranked compressor to the controller of the lowest ranked loaded compressor if the sensed discharge pressure of the highest ranked compressor remains greater than the set point pressure threshold established for the highest ranked compressor, and the unload delay timer has expired (i.e. equals zero (0)). The unloading subroutine is repeated until the sensed discharge pressure of the highest ranked compressor is less than or equal to the set point pressure threshold established for the highest compressor. The highest ranked compressor is preferably designated as the lead compressor for the compression system for a set time period. After expiration of the set time period, a lead transfer command may be transmitted from the highest ranked compressor to the next highest ranked compressor, wherein the highest ranked compressor is reassigned as the lowest ranked compressor and the second highest ranked compressor is reassigned as the highest ranked compressor.

Each compressor preferably has a unique identifier or address assigned thereto. During operation, the highest ranked compressor sends out a series of commands to all of the lower ranked compressors. Each command has a unique identifier so that each lower ranked compressor only responds to a command received from the highest ranked compressor that bears the unique identifier therefor. In preferred embodiments, each command is transmitted in a sequential order from the highest ranked compressor to the lower ranked compressors and onto the lowest ranked compressor. For example, in a system having six compressors ranked #1–6, the highest ranked compressor (#1) generates all the commands for the compression system. The command will pass sequentially from the highest ranked compressor #1 to the next highest ranked compressor #2 and eventually onto the lowest ranked compressor #6. Each command has a unique identifier tagged thereto so that the command will only be acted upon by the compressor assigned that unique identifier. If one or more of the compressors ranked below the highest ranked compressor does not receive a command from the highest ranked compressor within a predetermined period of time, then that particular compressor will operate within an internal pressure range setting that is stored in the memory of the controller of that particular compressor.

In preferred embodiments, each compressor includes a device, such as an adjustable inlet valve, for modulating the pressure of the compressed fluid discharged therefrom. Each compressor is adapted for operating in a modulation mode only when the respective compressor is ranked as the highest ranked compressor. When the compressors are ranked as lower ranked compressors, they are designed for operating in either the fully loaded state or the fully unloaded state.

The various controllers of the plurality of compressors are preferably in electronic communication with one another. Each controller generally includes a microprocessor and a memory. The highest ranked compressor is designated a lead unit and all of the lower ranked compressors are designated slave units. In certain preferred embodiments, the controllers of all the compressors are in communication with one another in a daisy-chain configuration. The system is designed for sequencing operation of the compressors so that over time the compressors run an equal amount of time. After a predetermined amount of time has elapsed, the highest ranked compressor transmits a lead transfer command to the second highest ranked compressor. Upon receiving the lead transfer command, the second highest ranked compressor responds to the highest ranked compressor and then becomes the highest ranked or lead compressor. Upon receiving the response from the new highest ranked compressor, the former highest ranked compressor becomes the lowest ranked compressor.

DETAILED DESCRIPTION OF PREFERRED EMBODIMENTS

Figure 1:
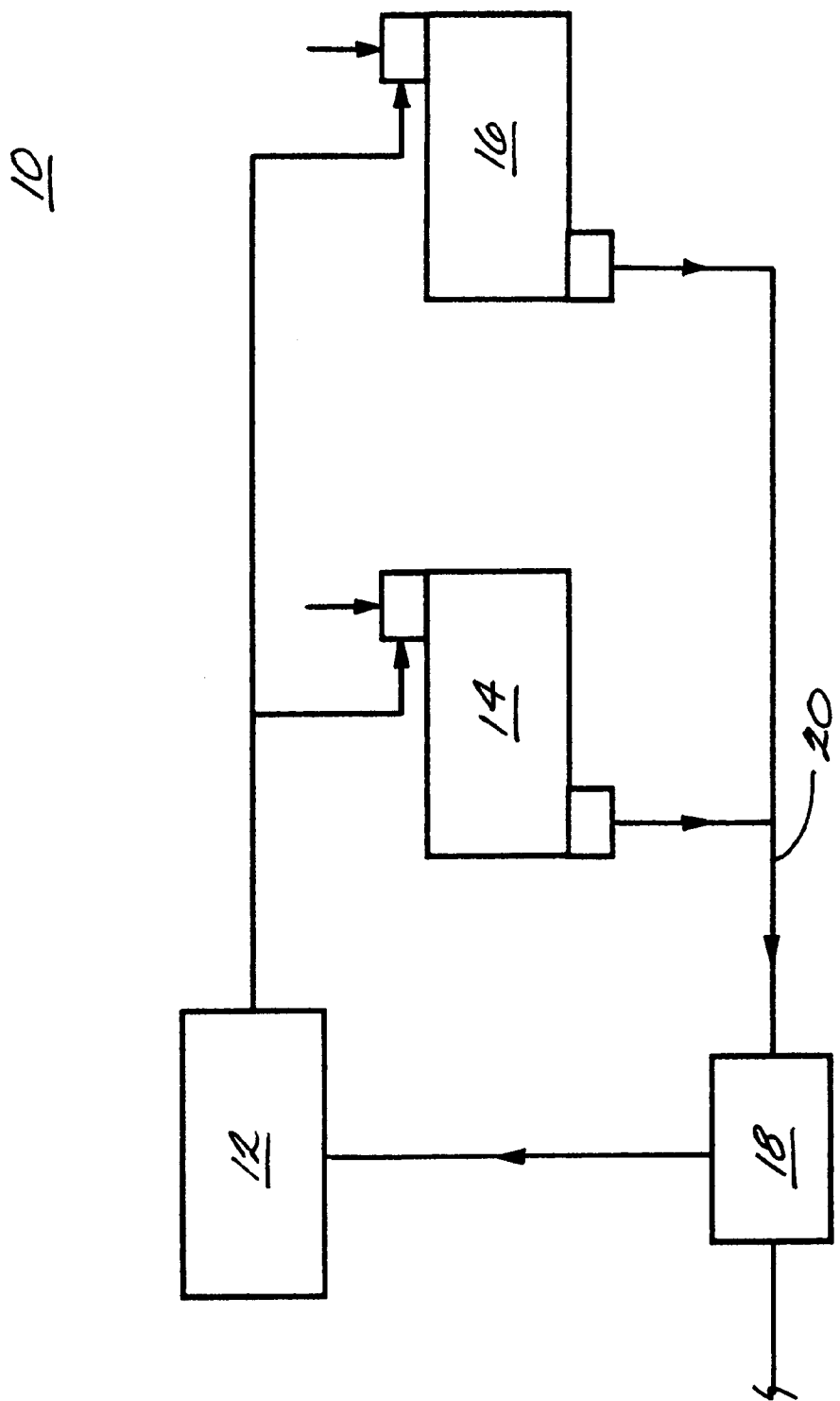
FIG. 1 shows a schematic representation of a prior art multiple compressor system that is controlled by an external host controller.
Figure 2:
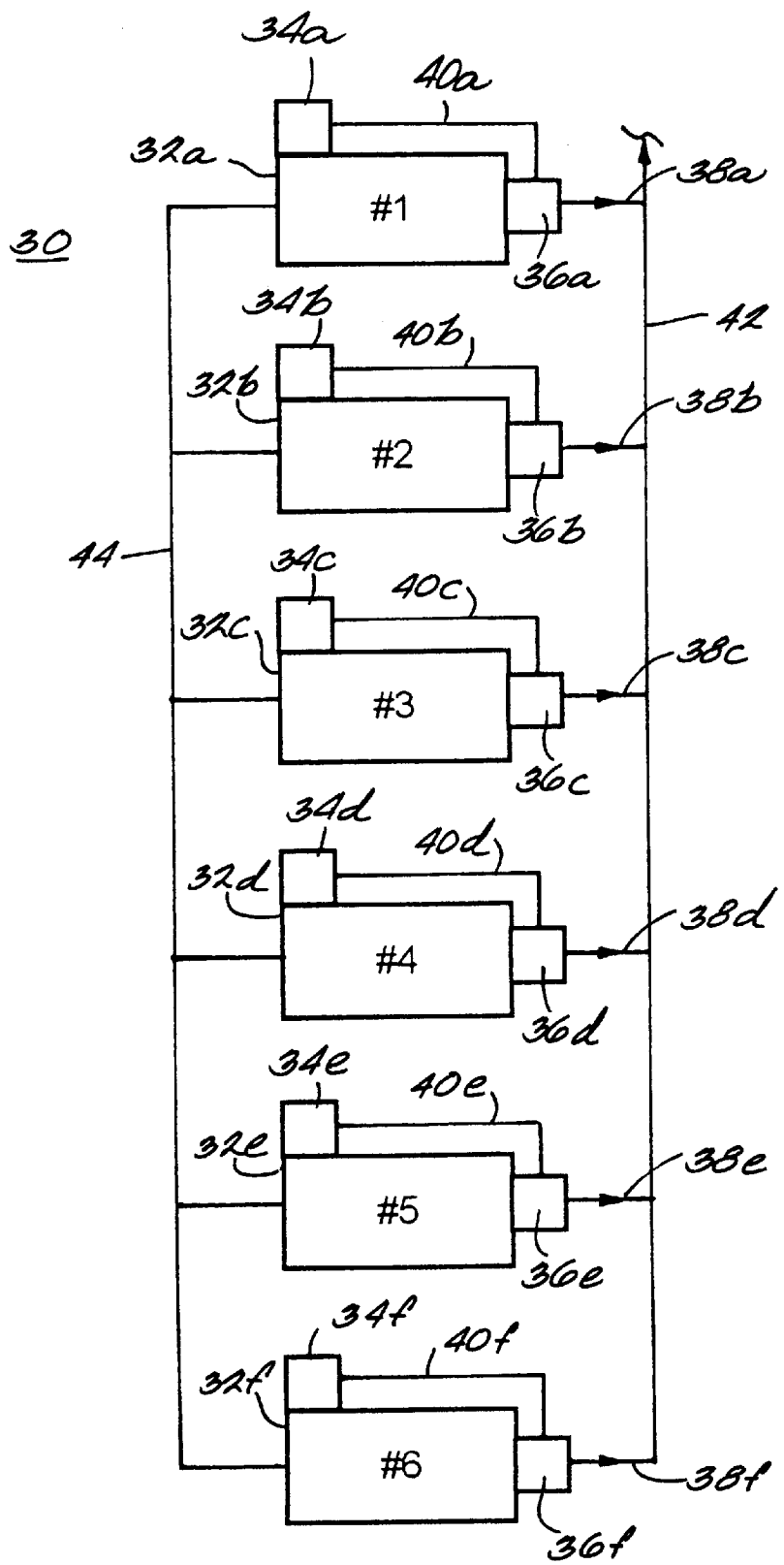
FIG. 2 shows a schematic representation of a multiple compressor system that does not require an external controller in accordance with certain preferred embodiments of the present invention.

FIG. 2 shows a compressor system 30 in accordance with preferred embodiments of the present invention. The system is designed to sequence air compressors, preferably over a single pressure band, without using an external device or controller. The sequencing logic is stored in the memory of the local controller of each air compressor. A unique feature of the present invention is that the highest ranked compressor (the lead unit) makes all of the loading and unloading decisions for the compressor system 30. The highest ranked compressor transmits load and unload commands to all of the other lower ranked compressors (slave units). This method is significantly different than prior art systems that have an external controller or that have the respective slave units evaluate their own discharge pressures for making loading and unloading decisions. With only one controller making decisions for the system (i.e. the controller of the highest ranked compressor), the air system is capable of operating at a reduced capacity. This design generally improves efficiency by keeping multiple units from operating at a reduced capacity at the same time.

The compression system 30 shown in FIG. 2 includes six fluid compressors numbered one through six (1–6) and designated compressors 32a, 32b, 32c, 32d, 32e and 32f. Although six compressors are shown in FIG. 2, it should be understood that the compression system 30 may include any number of compressors. Each of the compressors is preferably a positive displacement compressor, such as a rotary screw compressor of the type that is well known to one skilled in the pertinent art.

The operation of each compressor 32a–32d is monitored by a respective local compressor controller 34a–34f. The local controllers 34a–34f are microprocessor based controllers having memory storage devices that are well known to one skilled in the art. The local controllers are connected by wires 44, preferably in a daisy chained configuration, for the serial transfer of commands, responses and/or data therebetween. A set point pressure threshold for each compressor 32a–32f is stored in the memory of each respective local controller 34a–34f. The set point pressure threshold may be a pressure range having an upper limit and a lower limit or may be a single pressure point, such as 80 psi. Moreover, each compressor 32a–32f has a unique address or identifier that is unique to that particular compressor. Commands and data are transmitted serially between the compressors via communication line 44, whereby each command/data transmission contains only one address. Although all transmissions will move sequentially between all of the compressors, a local controller will only respond to transmissions that contain the unique address for that particular controller.

During operation of compressor system the controllers are capable of receiving and processing compressor operating parameter signals from a pressure sensor. More particularly, the local controllers 34a–34f receive signals from respective discharge pressure sensors 36a–36f which sense the pressure of the compressed fluid discharged from the respective compressors 32a–32f to discharge flow lines 38a–38f. The sensed discharge pressure signals travel to the local controllers 34a–34f through communication lines 40a–40f. The flow lines 38a–38f are flow connected to a main supply line 42 which may be flow connected to a receiver tank or object of interest such as a pneumatic tool (both not shown). Uncompressed gas, such as ambient air, is preferably introduced into the compressors 32a–32f through inlet valves (not shown). The inlet valves preferably include one or more devices for repositioning the inlet valves to adjust the volume of air supplied to the respective compressors 32a–32f.

Figure 3:
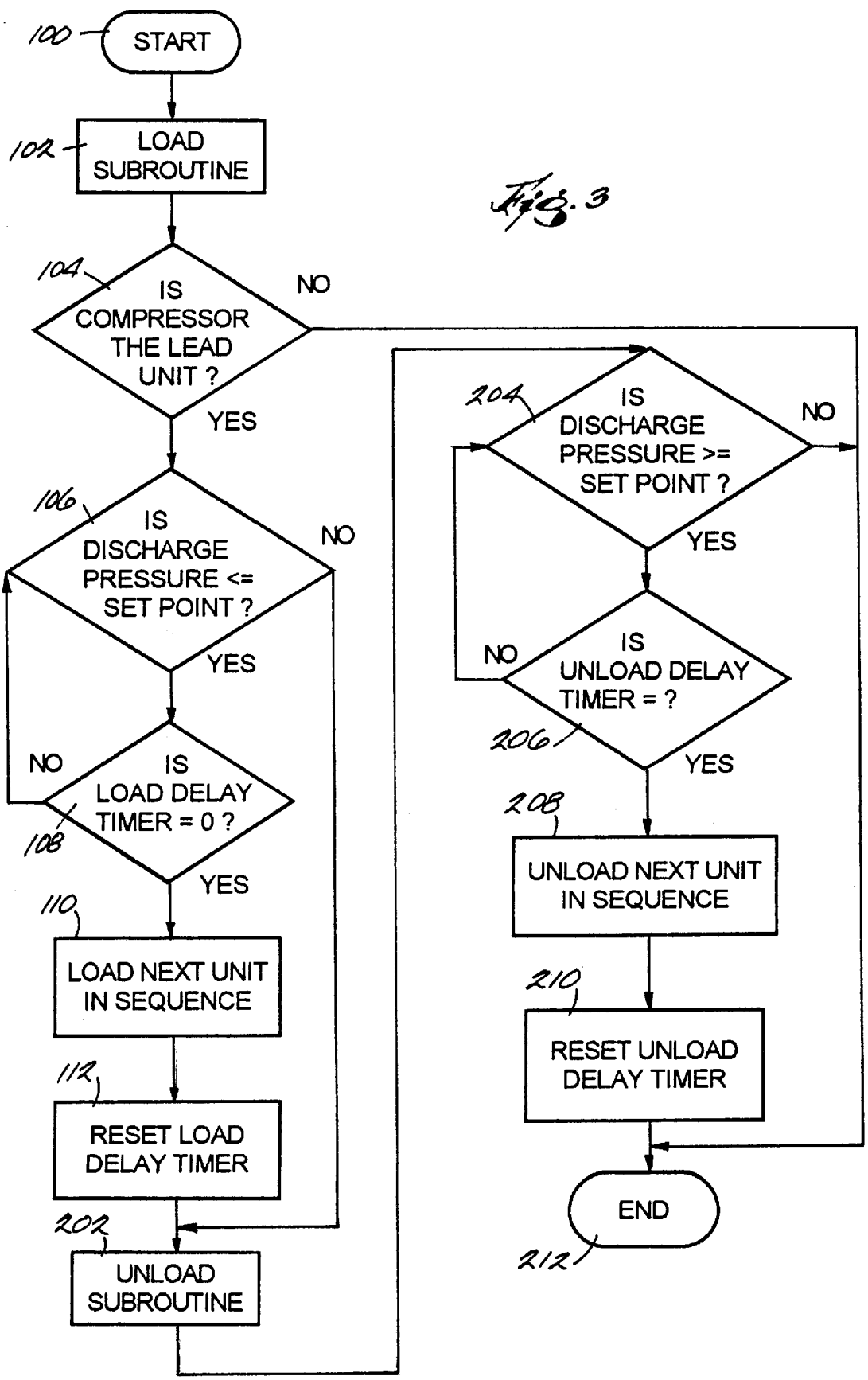
FIG. 3 shows a flowchart representation that illustrates the logic of the method for controlling a plurality of compressors in accordance with preferred embodiments of the present invention.

FIG. 3 shows a control subroutine 100 including a logic diagram for a preferred method for controlling a plurality of compressors. As mentioned above, the highest ranked or lead unit will initiate all of the transmissions for the system and the other units, i.e. all units ranked below the highest ranked unit, will operate as slave units. The slave units will not initiate commands for the system but will only preferably respond to the highest ranked or lead unit upon receiving a command therefrom. During operation of the system, the highest ranked unit will collect status information from the other compressors and use that information for controlling the other compressors. The highest ranked compressor will determine when to load and unload the lower ranked compressors by comparing the sensed discharge pressure of the highest ranked compressor to the load/unload pressure threshold for the highest ranked compressor. Thus, the lead unit will control the system pressure over a single pressure band. The highest ranked compressor loads and unloads the lower ranked compressors by transmitting serial commands to the lower ranked compressors.

Referring to FIG. 3, the control subroutine 100 includes a loading subroutine 102 and an unloading subroutine 202. After commencing the control subroutine at step 100, the logic initially ranks all of the compressors from the highest ranked compressor to the lowest ranked compressor. Referring to FIG. 2, in one preferred logic sequence the compressor 32a is designated as the highest ranked compressor (#1) and compressor 32f is designated as the lowest ranked compressor (#6). Compressors 32b, 32c, 32d and 32e (compressor numbers #2–5) are all ranked lower than compressor 32a, whereby compressor 32b (#2) is ranked higher than compressor 32c (#3) which, in turn, is ranked higher than compressor 32d (#4) which, in turn, is ranked higher than compressor 32e (#5). Referring to FIGS. 2 and 3, at step 104 the logic determines which compressor is the highest ranked compressor for the system. At step 106, the local controller 34a of the highest ranked compressor 32a obtains a discharge pressure reading from discharge pressure sensor 36a and sends the sensed pressure reading to the local controller 34a via line 40a. If the sensed discharge pressure is greater than the set point pressure threshold then the logic proceeds to the unloading subroutine 202 that will be explained in more detail below. If the sensed pressure reading remains less than or equal to the set point pressure threshold, the logic commences a load delay timer at step 108. The load delay timer preferably constitutes a time delay of approximately 15–60 seconds. By providing for a 15–60 second delay, the logic allows time for system pressure to build up before the logic must make a final decision before loading another compressor. If the delay timer has not expired, the logic proceeds to step 106 and once again determines if the sensed discharge pressure remains less than or equal to the set point pressure threshold. If the sensed pressure remains less than or equal to the set point pressure threshold, the local controller 34a of the highest ranked compressor 32a sends a load command to the next highest ranked unloaded compressor (i.e. compressor 32b) at step 110. After step 110, the logic resets the load delay timer at step 112.

The unloading subroutine begins at step 202. At decision block 204, the logic determines whether the sensed pressure reading is greater than the set point pressure threshold. If the sensed pressure reading is less than of equal to the set point pressure threshold, then the logic maintains the status quo and proceeds to the end of the subroutine at step 212. If the sensed pressure reading is greater than the set point pressure threshold at step 206, then an unload delay timer is set equal to approximately 15–60 seconds. If the sensed discharge pressure remains greater than the set point pressure then the system unloads the lowest ranked loaded compressor at step 208. The logic then resets the unload delay timer at step 210.

EXAMPLE

Referring to FIGS. 2 and 3, in one preferred embodiment, the set point pressure threshold of 80 psi is stored in the memory of each local controller 34a–34f. The load delay timer is set equal to 30 seconds and the unload delay timer is also set equal to 30 seconds. Initially, compressor 32a (#1) is ranked as the highest ranked compressor and compressor 32f (#6) is ranked as the lowest ranked compressor. As such, compressor 32a is the lead compressor and the remaining compressors (i.e. 32b–32f) are slave compressors that follow commands initiated by lead compressor 32a. After entering the control routine at step 100, the logic enters the load subroutine at step 102. At step 104, the logic determines that compressor 32a is the highest ranked or lead compressor for the system. At step 106, the logic determines that the sensed pressure reading at 36a is less than or equal to the set point pressure threshold of 80 psi. After the 30 second load delay timer has expired, the logic once again proceeds to step 106 to determine whether the sensed pressure is less than or equal to 80 psi. If the sensed pressure remains less than 80 psi, the next highest ranked unloaded compressor is loaded at step 110 (i.e. compressor 32b).

The logic continues to cycle through the control routine until enough compressors have been added so that the sensed pressure reading is greater than 80 psi. Once the sensed pressure reading reaches 80 psi, the highest ranked compressor 32a is capable of modulating for maintaining the system pressure close to the 80 psi level.

The logic commences the unload subroutine at step 202. At this step, the logic determines whether the sensed pressure reading at 36a is greater than the set point pressure threshold of 80 psi. After the 30 second unload delay timer has expired, the logic once again determines whether the sensed pressure threshold is greater than or equal to 80 psi. The logic then unloads the lowest ranked loaded compressor (e.g. compressor 32f/#6). The logic continues to cycle through the control routine until enough compressors have been unloaded so that the sensed pressure reading is less than or equal to 80 psi. At this point, the highest ranked compressor may modulate for maintaining the system pressure close to 80 psi.

In certain preferred embodiments, the highest ranked compressor will transmit a load command to the next highest ranked unloaded compressor only if the sensed discharge pressure is not rising. In this preferred embodiment, the load signal will not be transmitted to the next highest ranked unloaded compressor so long as the pressure level continues to rise. In other preferred embodiments, the lead compressor will not transmit an unload command to the lowest ranked loaded compressor in the sequence if the sensed discharge pressure continues to fall.

Each compressor unit is preferably equipped with a modulating inlet valve, a variable speed drive motor or other preferred methods for controlling the capacity of the system so that each compressor, when operating as the highest ranked or lead compressor, will be able to adjust its flow locally in order to attempt to match the load/unload pressure threshold. Modulating the lead compressor will minimize cycling of the lower ranked compressors (loading and unloading). Only the highest ranked compressor will operate in this modulating fashion. All of the lower ranked compressors will only operate in a fully loaded or unloaded mode.

Operation of the compressors is sequenced so that all of the compressors operate approximately the same amount of time. In one preferred embodiment, the highest ranked compressor operates as the lead unit for a predetermined number of hours or until a certain hour in a day. At that predetermined point in time, the highest ranked unit will transfer the lead to the next unit in the sequence by transmitting a lead transfer command. Upon transmission of the command and receipt of a response from the new lead unit, the old lead unit will begin to operate as a slave unit and the new lead unit will start controlling the other compressors.

In further preferred embodiments, each of the slave compressors in the system has a timeout function. In one of the slave compressors does not receive a transmission from the lead compressor within a predetermined amount of time, the slave compressor will start to operate on its own settings until the lead compressor reestablished communications. The slave compressor will also have a high pressure safety function. If the lead compressor loads the slave unit to a pressure above the slave unit's maximum operating pressure, the slave unit will unload itself.

The above disclosure describes only certain preferred embodiments of a variable oil flow regulator for a compressor and is not intended to limit the scope of the present invention to the exact construction and operation shown and described herein. The foregoing is considered to merely illustrate certain principles of the invention. For example, it is contemplated that the variable oil flow regulator disclosed herein may be used for any type of compressor (e.g., reciprocating, centrifugal, rotary) or pump. Thus, it should be evident to those skilled in the art that numerous modifications and changes may be made to the embodiments shown herein while remaining within the scope of the present invention as described and claimed.

What is claimed is:

1. A method for controlling the operation of a fluid compression system having a plurality of compressors, each compressor having a controller for controlling operation thereof and a sensor for sensing the pressure of compressed fluid discharged therefrom, the method comprising the steps of:

designating one of said compressors as a highest ranked compressor; establishing a set point pressure threshold for loading and unloading each compressor;

assigning a sequential ranking to said compressors beginning with the highest ranked compressor, wherein the highest ranked compressor will initiate all commands for controlling all lower ranked compressors in the compression system;

commencing a loading subroutine including the steps of:
loading the highest ranked unloaded compressor;
setting a load delay timer;
sensing the pressure of the compressed fluid discharged from said highest ranked compressor;
comparing the sensed discharge pressure of the highest ranked compressor to the set point pressure threshold established for the highest ranked compressor;
transmitting a load command from the controller of the highest ranked compressor to the controller of the next highest ranked unloaded compressor if:
the sensed discharge pressure of the highest ranked compressor remains less than or equal to the set point pressure threshold established for the highest ranked compressor, and
the load delay timer equals zero; and
repeating the loading subroutine until the discharge pressure of the highest ranked compressor is greater than the set point pressure threshold established therefor.

2. The method as claimed in claim 1, wherein the controller of the highest ranked compressor commences an unloading routine if the discharge pressure of the highest ranked compressor is greater than the set point pressure threshold of the highest ranked compressor, the unloading subroutine including the steps of:
unloading the lowest ranked loaded compressor;
setting an unload delay timer;
after the unloading the lowest ranked compressor step, sensing the pressure of the compressed fluid discharged from the highest ranked compressor;
comparing the sensed discharge pressure of the highest ranked compressor to the set point pressure threshold established for the highest ranked compressor;
transmitting an unload command from the controller of the highest ranked compressor to the controller of the lowest ranked loaded compressor if:
the sensed discharge pressure of the highest ranked compressor remains greater than the set point pressure threshold established for the highest ranked compressor, and
the unload delay timer equals zero; and
repeating the unloading subroutine until the sensed discharge pressure of the highest ranked compressor is less than or equal to the set point pressure threshold established therefor.

3. The method as claimed in claim 1, further comprising the steps of:
designating the highest ranked compressor as the lead compressor for the compression system for a set time period; and
after expiration of the set time period, transmitting a lead transfer command from the highest ranked compressor to the next highest ranked compressor, wherein the highest ranked compressor is reassigned as the lowest ranked compressor and the second highest ranked compressor is reassigned as the highest ranked compressor.

4. The method as claimed in claim 1, further comprising the step of assigning a unique identifier to each said compressor, wherein each said compressor only responds to commands received from the highest ranked compressor bearing the unique identifier therefor.

5. The method as claimed in claim 1, wherein each said compressor includes means for modulating the pressure of the compressed fluid discharged therefrom, each said compressor being adapted for operating in a modulation mode when said compressor is ranked as the highest ranked compressor, the method further comprising the step of modulating the amount of compressed fluid generated by said lead compressor.

6. The method as claimed in claim 5, wherein said modulation means includes an adjustable inlet valve.

7. The method as claimed in claim 1, wherein each said command is transmitted in a sequential order from the highest ranked compressor to the lowest ranked compressor.

8. The method as claimed in claim 7, wherein at least one of said compressors is adapted for operating within an internal pressure range setting if said compressor does not receive a command from the highest ranked compressor within a predetermined time period.

9. The method as claimed in claim 1, wherein the controllers of said compressors are in electronic communication with one another.

10. The method as claimed in claim 1, wherein each said controller includes a microprocessor and a memory.

11. The method as claimed in claim 1, wherein the highest ranked compressor is designated a lead unit and all lower ranked compressors are designated slave units.

12. The method as claimed in claim 3, further comprising the step of transmitting the lead transfer command after a predetermined period of time has elapsed.

* * * * *